(12) United States Patent
Zhao et al.

(10) Patent No.: US 12,155,868 B2
(45) Date of Patent: Nov. 26, 2024

(54) VIDEO PROCESSING METHOD AND APPARATUS, DEVICE, AND STORAGE MEDIUM

(71) Applicant: Tencent Technology (Shenzhen) Company Limited, Shenzhen (CN)

(72) Inventors: Yuanyuan Zhao, Shenzhen (CN); Jingjing Ren, Shenzhen (CN); Chen Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/224,501

(22) Filed: Jul. 20, 2023

(65) Prior Publication Data
US 2023/0362416 A1 Nov. 9, 2023

Related U.S. Application Data (63) Continuation of application No. PCT/CN2022/131919, filed on Nov. 15, 2022.

(30) Foreign Application Priority Data

Feb. 8, 2022 (CN) .......................... 202210118524.5

(51) Int. Cl.
*H04N 19/87* (2014.01)
*G06V 10/26* (2022.01)
(Continued)

(52) U.S. Cl.
CPC ............. *H04N 19/87* (2014.11); *G06V 10/26* (2022.01); *G06V 10/7715* (2022.01);
(Continued)

(58) Field of Classification Search
CPC .... G06V 10/26; G06V 10/7715; G06V 20/40; G06V 20/46; G06V 20/49; H04N 19/124;
(Continued)

(56) References Cited

U.S. PATENT DOCUMENTS

| 2020/0134321 A1* | 4/2020 | Chen ...................... G06V 20/48 |
| 2021/0203997 A1* | 7/2021 | Veselov ............... G06V 10/454 |

FOREIGN PATENT DOCUMENTS

| CN | 110728330 A | 1/2020 |
| CN | 111368133 A * | 7/2020 ............. G06F 16/71 |

(Continued)

OTHER PUBLICATIONS

H. Choi and I. V. Bajić, "Deep Feature Compression for Collaborative Object Detection," 2018 25th IEEE International Conference on Image Processing (ICIP), Athens, Greece, 2018, pp. 3743-3747, doi: 10.1109/ICIP.2018.8451100.*

(Continued)

*Primary Examiner* — Mohammed S Rahaman
(74) *Attorney, Agent, or Firm* — Morgan, Lewis & Bockius LLP (57) ABSTRACT

This application discloses a video processing method performed by a computer device. The method includes: inputting a target video and a video mask to an encoding model for feature extraction to obtain a first video feature vector and a second video feature vector; determining an index distribution of the first quantization feature vector in a discrete hidden space composed on the basis of the first quantization feature vector; determining a second quantization feature vector in the discrete hidden space on the basis of the second video feature vector and the index distribution of the first quantization feature vector; and inputting the first quantization feature vector and the second quantization feature vector to a decoding model to obtain a reconstructed
(Continued)

video, the reconstructed video referring to a video with a content of the masked region of the target video filled in accordance with the second quantization feature vector.

20 Claims, 5 Drawing Sheets

(51) Int. Cl.
    *G06V 10/77*           (2022.01)
    *G06V 20/40*           (2022.01)
    *H04N 19/124*         (2014.01)
    *H04N 19/136*         (2014.01)
    *H04N 19/42*           (2014.01)
    *H04N 19/60*           (2014.01)

(52) U.S. Cl.
    CPC .............. *G06V 20/46* (2022.01); *G06V 20/49* (2022.01); *H04N 19/124* (2014.11); *H04N 19/136* (2014.11); *H04N 19/42* (2014.11); *H04N 19/60* (2014.11)

(58) Field of Classification Search
    CPC .. H04N 19/132; H04N 19/136; H04N 19/167; H04N 19/17; H04N 19/42; H04N 19/60; H04N 19/87
    See application file for complete search history.

(56) References Cited

FOREIGN PATENT DOCUMENTS

| | | | | |
|---|---|---|---|---|
| CN | 112733794 A | | 4/2021 | |
| CN | 113705290 A | * | 11/2021 | .............. G06N 3/04 |
| CN | 114449345 A | | 5/2022 | |
| WO | WO 2020192704 A1 | | 10/2020 | |
| WO | WO 2021135499 A1 | | 7/2021 | |

OTHER PUBLICATIONS

Tencent Technology, ISR, PCT/CN2022/131919, Feb. 13, 2023, 3 pgs.

Tencent Technology, WO, PCT/CN2022/131919, Feb. 15, 2023, 6 pgs.

Tencent Technology, IPRP, PCT/CN2022/131919, Aug. 6, 2024, 7 pgs.

* cited by examiner

VIDEO PROCESSING METHOD AND APPARATUS, DEVICE, AND STORAGE MEDIUM

CROSS-REFERENCE TO RELATED APPLICATIONS

This application is a continuation application of PCT Patent Application No. PCT/CN2022/131919, entitled "VIDEO PROCESSING METHOD AND APPARATUS, DEVICE, AND STORAGE MEDIUM" filed on Nov. 15, 2022, which claims priority to Chinese Patent Application No. 2022101185245, entitled "VIDEO PROCESSING METHOD AND APPARATUS, DEVICE, AND STORAGE MEDIUM" filed with the China National Intellectual Property Administration on Feb. 8, 2022, all of which is incorporated herein by reference in its entirety.

FIELD OF THE TECHNOLOGY

This application relates to a video processing method performed by a computer device.

BACKGROUND OF THE DISCLOSURE

With the popularization of mobile terminals and the optimization of networks, posting and playing videos have gradually become one of ways of entertainment. When users edit and create videos, it is necessary to remove certain characters or items that appear in the videos and fill in the background, to protect the privacy in the videos or keep the videos beautiful.

In related technologies, effective information between related frames is integrated in a way of integrating timing sequence structures, thereby filling missing regions of a video with the effective information in the related frames. However, when the video is filled in the way of integrating the timing sequence structures, there is often a problem of poor filling effect.

SUMMARY

According to various embodiments provided in this application, a video processing method and apparatus, a device, and a storage medium are provided.

According to one aspect of this application, a video processing method is performed by a computer device and the method including:

inputting a target video and a video mask to an encoding model for feature extraction to obtain a first video feature vector corresponding to an unmasked region and a second video feature vector corresponding to a masked region, the video mask masking the target video to obtain the masked region;

obtaining a first quantization feature vector corresponding to the first video feature vector of the target video, and determining an index distribution of the first quantization feature vector in a discrete hidden space formed on the basis of the first quantization feature vector;

determining a second quantization feature vector in the discrete hidden space on the basis of the second video feature vector and the index distribution; and inputting the first quantization feature vector and the second quantization feature vector to a decoding model to obtain a reconstructed video, the reconstructed video referring to a video with a content of the masked region of the target video filled in accordance with the second quantization feature vector.

According to another aspect of this application, a computer device is provided. The computer device includes a memory and a processor. The memory stores computer-readable instructions that, when executed by the processor, cause the computer device to implement the steps of the above video processing method.

According to another aspect of this application, a non-transitory computer-readable storage medium is provided. The computer-readable storage medium stores computer-readable instructions, and the computer-readable instructions, when executed by a processor of a computer device, cause the computer device to implement the steps of the above video processing method.

BRIEF DESCRIPTION OF THE DRAWINGS

To describe the technical solutions in the embodiments of this application or the related technology more clearly, the following briefly describes the accompanying drawings required for describing the embodiments or the related technology. Apparently, the accompanying drawings in the following descriptions show merely the embodiments of this application, and a person of ordinary skill in the art may still derive other drawings from these accompanying drawings without creative efforts.

The accompanying drawings here are incorporated into the specification and form a part of the specification, demonstrating the embodiments that comply with this application and used together with the specification to explain the principles of this application.

DESCRIPTION OF EMBODIMENTS

The technical schemes in the embodiments of this application will be clearly and completely described below with reference to the drawings in the embodiments of this application, and it is obvious that the described embodiments are only a part of the embodiments of this application, but not all of them. Based on the embodiments in this application, all other embodiments obtained by those of ordinary skill in the art without creative work all fall within the protection scope of this application.

Figure 1:
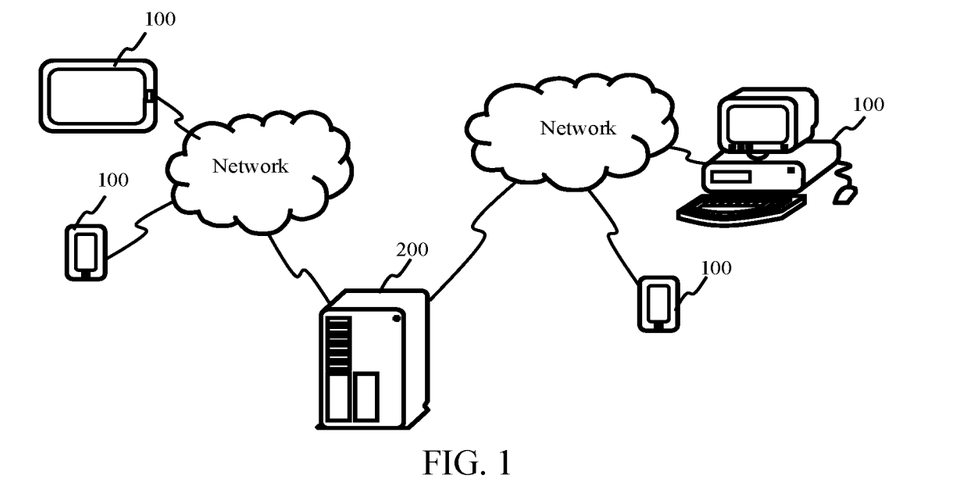
FIG. 1 is a schematic diagram of a computer system architecture of a video processing method according to an exemplary embodiment of this application.

FIG. 1 shows an architecture of a computer system of a video processing method according to an embodiment of this application. The computer system may include: a terminal 100 and a server 200.

The terminal 100 can be an electronic device such as a mobile phone, a tablet computer, a vehicle-mounted terminal (vehicle-mounted machine), a wearable device, a personal computer (PC), an intelligent voice interaction device, a smart home appliance, a vehicle-mounted terminal, an aircraft, and a vending machine. The terminal 100 can install a client that runs a target application. The target application can be an application that supports picture capturing or other applications that provide a picture capturing function. This application does not limit this. In addition, this application does not limit the form of the target application, including but not limited to applications (apps), mini programs, and the like installed in the terminal 100, and can also be in the form of web pages.

The server 200 may be an independent physical server, a server cluster composed of a plurality of physical servers, or a distributed system, or may be a cloud server that provides cloud computing services. The server 200 may be a background server of the above target application, and is configured to provide background services for the client of the target application.

The terminal 100 communicates with the server 200 by using a network, for example, a wired or wireless network.

For a video processing method provided in this embodiment of this application, an executive body of all steps may be a computer device. The computer device refers to an electronic device with data computing, processing, and storage capabilities. An implementation environment shown in FIG. 1 is taken as an example. The video processing method can be executed by the terminal 100 (for example, the video processing method is implemented by a client of a target application installed and run in terminal 100), or can be executed by the server 200, or can be alternately executed by the terminal 100 and the server 200. This application does not limit this.

Figure 2:
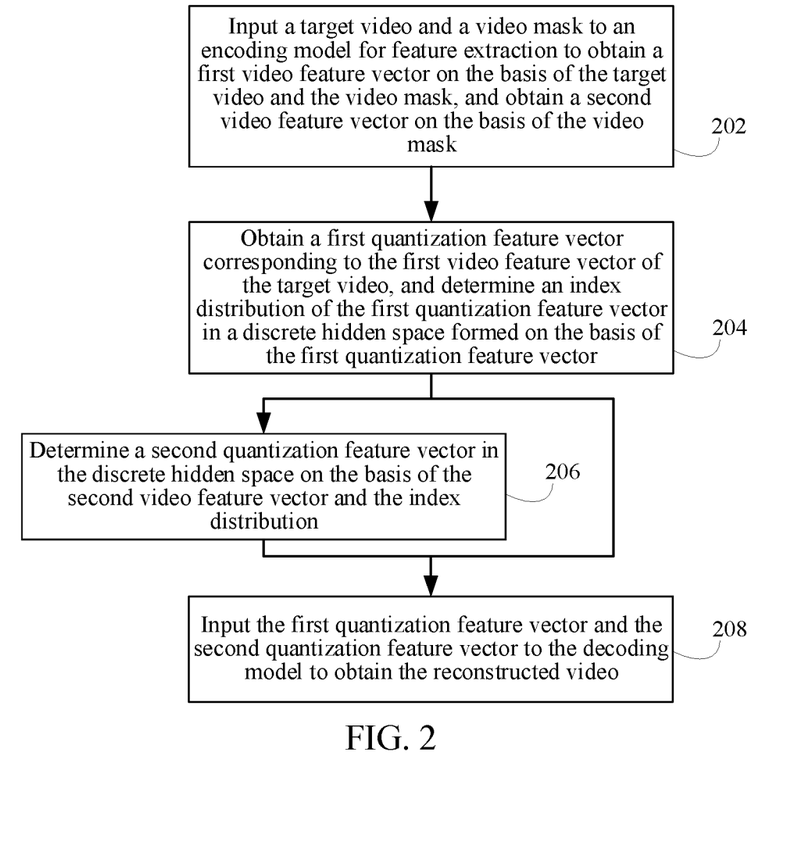
FIG. 2 is a flowchart of a video processing method according to one exemplary embodiment of this application.

FIG. 2 shows a flowchart of a video processing method provided in an exemplary embodiment of this application. The method may be implemented by a computer device. The computer device may be the terminal 100 or the server 200 in FIG. 1. The video processing method may include the following steps:

Step 202: Input a Target Video and a Video Mask to an Encoding Model for Feature Extraction, and Obtain a First Video Feature Vector and a Second Video Feature Vector on the Basis of the Target Video and the Video Mask.

The target video refers to a video needing to be filled. The video mask is used for masking the target video to obtain a masked region. The video mask may perform masking processing on an image region needing to be filled in the target video, thereby changing the image region needing to be filled into the masked region. The masking processing may be understood as shielding pixel points. The image region needing to be filled may include an image content needing to be removed or blocked. A target included in the image content can be random. For example, it may include a person or an item in the target video. This embodiment of this application does not limit this. Correspondingly, an unmasked region may be an unmasked image region in the target video, and the unmasked image region does not need to be filled.

The encoding model refers to a trained encoding model that can be used for extracting feature vectors of the target video and the video mask.

After obtaining the target video and the video mask, the computer device inputs the target video and the video mask to the encoding model for feature extraction and obtains the first video feature vector and the second video feature vector on the basis of the target video and the video mask, The first video feature vector refers to a feature vector corresponding to the unmasked region. The second video feature vector refers to a feature vector corresponding to the masked region. In specific implementation, the unmasked region includes a plurality of pixel points. Each pixel point corresponds to a first video feature vector, and different pixel points may correspond to different first video feature vectors. The masked region also includes a plurality of pixel points. The pixel points of the masked region have the same function, which are used for image blocking. These feature points may correspond to the same second video feature vector.

Step 204: Obtain a First Quantization Feature Vector Corresponding to the First Video Feature Vector of the Target Video, and Determine an Index Distribution of the First Quantization Feature Vector in a Discrete Hidden Space Formed on the Basis of the First Quantization Feature Vector.

A quantization feature vector refers to a feature vector corresponding to a video feature, and may be obtained by performing quantization processing on the video feature.

The first quantization feature vector refers to a quantization feature vector corresponding to the first video feature vector of the target video. The first quantization feature vector may be obtained by performing quantization processing on the first video feature vector.

The index distribution is used for indicating a position distribution of the first quantization feature vector in the discrete hidden space. Since the first quantization feature vector is obtained by quantizing the first video feature vector, the index distribution may be used for indicating a corresponding position distribution of the various pixel points in the unmasked region in the discrete hidden space.

Step 206: Determine a Second Quantization Feature Vector in the Discrete Hidden Space on the Basis of the Second Video Feature Vector and the Index Distribution.

The second quantization feature vector refers to a quantization feature vector used for filling the masked region.

The computer device may determine, according to the second video feature vector corresponding to the masked region of the target video and the position distribution of the first quantization feature vector in the discrete hidden space, the second quantization feature vector used for filling the masked region in the discrete hidden space.

Step 208: Input the First Quantization Feature Vector and the Second Quantization Feature Vector to the Decoding Model to Obtain a Reconstructed Video.

The reconstructed video refers to a video obtained by filling a content of the masked region of the target video.

The decoding model is a trained decoding model and is used for transforming quantization feature vectors into a video form.

Further, after obtaining the reconstructed video, the computer device may store the reconstructed video. In other embodiments, after obtaining the reconstructed video, the computer device may output the reconstructed video.

In summary, the solution shown in this embodiment of this application obtains the first video feature vector and the second video feature vector by inputting the obtained target video and the video mask to the encoding model for feature extraction, and determines the index distribution of the first quantization feature vector in the discrete hidden space composed on the basis of the first quantization feature vector. The computer device determines the second quantization feature vector in the discrete hidden space on the basis of the second video feature vector and the index distribution, and inputs the first quantization feature vector and the second quantization feature vector to the decoding model to obtain the reconstructed video. The second quantization feature vector is determined from the discrete hidden space, and the discrete hidden space is composed of the first quantization feature vector corresponding to the unmasked region in the target video, which conforms to representation of the target video. Therefore, the target video can be filled with a content that better matches the unmasked region, to obtain a natural and harmonious high-quality video, thereby improving the video filling effect. In addition, in this application, the second quantization feature vector is obtained from the discrete hidden space for video filling, which reduces the difficulty of video filling implementation and improves the efficiency of video filling.

Figure 3:
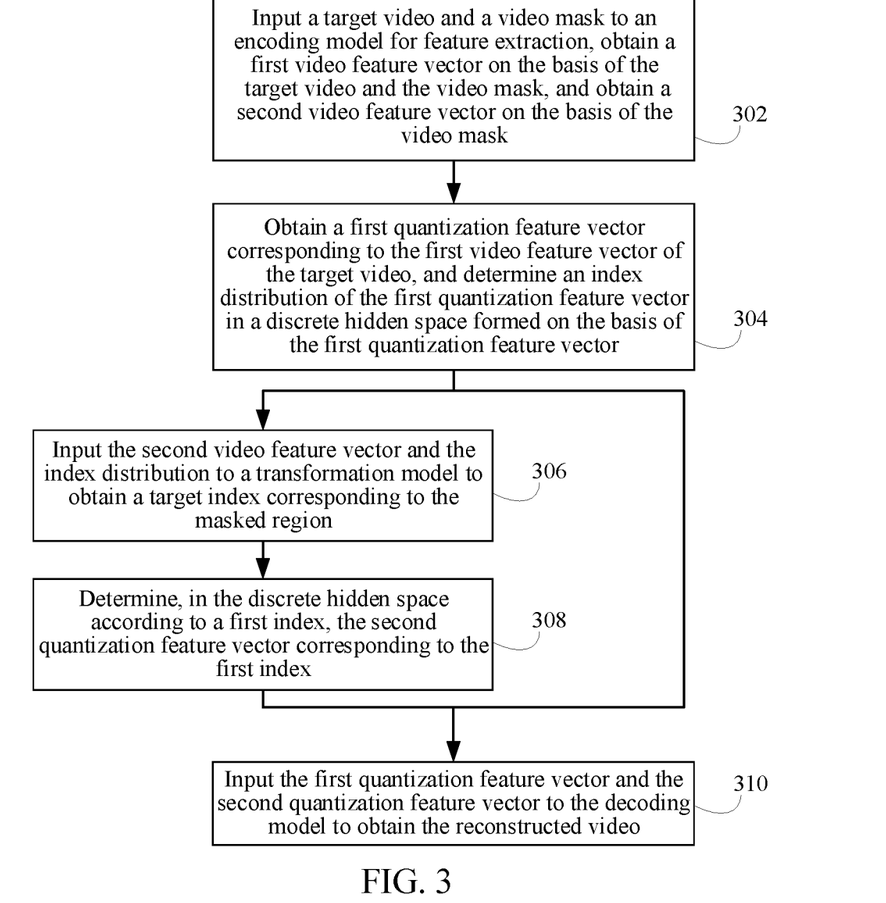
FIG. 3 is a flowchart of a video processing method provided by an exemplary embodiment of this application.

FIG. 3 is a flowchart of a video processing method provided by an exemplary embodiment of this application. The method may be implemented by a computer device, and the computer device may be the terminal 100 or the server 200 in FIG. 1. Parts included in this embodiment that are the same as those in the previous embodiment can refer to the explanation in the previous embodiment. Specifically, the video processing method may include the following steps:

Step 302: Input a Target Video and a Video Mask to an Encoding Model for Feature Extraction, and Obtain a First Video Feature Vector and a Second Video Feature Vector on the Basis of the Target Video and the Video Mask.

In one possible implementation, the computer device inputs, to the encoding model for feature extraction, a masked video obtained after multiplying the target video with the video mask, and obtains the first video feature vector and the second video feature vector on the basis of the target video and the video mask.

For example, the computer device inputs multiple frames of images $x^{t-1}$, $x^t$, $x^{t+1}$ in the target video and corresponding video masks $m^{t-1}$, $m^t$, $m^{t+1}$ to the encoding model for feature extraction.

A formula for extracting the first video feature vector is:

$$f_{e1} = E(x \odot (1-m))$$

where: $f_{e1}$ is the first video feature vector extracted by the encoding model; E is the encoding model; x is an image in the target video; and m is a video mask corresponding to an image in the target video; and $\odot$ represents element-by-element multiplication.

A formula for extracting the second video feature vector is:

$$f_{e2} = E(m)$$

where: $f_{e2}$ is the second video feature vector extracted by the encoding model; E is the encoding model; and m is a video mask corresponding to an image in the target video.

Step 304: Obtain a First Quantization Feature Vector Corresponding to the First Video Feature Vector of the Target Video, and Determine an Index Distribution of the First Quantization Feature Vector in a Discrete Hidden Space Formed on the Basis of the First Quantization Feature Vector.

In one possible implementation, the computer device may determine, from a video codebook according to spatial positions between the first video feature vector and quantization feature vectors in the video codebook, a quantization feature vector having a distance value satisfying a distance condition to the first video feature vector as the first quantization feature vector. The distance condition here refers to a condition used for limiting a distance between the first video feature vector and the first quantization feature vector. For example, the condition may be at least one of the following: a distance value is minimum or a distance value is less than a preset distance threshold. The video codebook includes the quantization feature vectors corresponding to various videos. In specific implementation, a quantization feature vector corresponding to a video may be a quantization feature vector corresponding to a pixel feature point in the video, that is, each pixel feature point may correspond to one quantization feature vector.

In one possible implementation, after the video codebook corresponding to the target video is determined, the discrete hidden space composed of the first quantization feature vector may be a hidden space composed of the various quantization feature vectors in the video codebook.

For example, the video codebook ε may be represented as:

$$\varepsilon = \{e_k \in R^d | k \in \{1, 2, \ldots, k\}\}$$

where $e_k$ is a quantization feature vector; $R^d$ is a set of quantization feature vectors; and k is a quantity of the quantization feature vectors, and may be flexibly set according to a need, such as 10000.

Further, the computer device may determine, in the discrete hidden space composed on the basis of the first quantization feature vector, a position distribution of the first quantization feature vector in the discrete hidden space according to relative spatial position relationships between the first quantization feature vector and other first quantization feature vectors in the discrete hidden space.

In one possible implementation, a formula for determining the first quantization feature vector may be:

$$(f_q)_i^t = \operatorname*{argmin}_{e_k \in \varepsilon} \|(f_e)_i^t - e_k\|$$

where $f_q$ is the first quantization feature vector; i is a subscript of an index corresponding to the first quantization feature vector; t is a $t^{th}$ frame in the target video; and argmin is a value of a variable when a spatial position between the first video feature vector and the quantization feature vector in the video codebook reaches a minimum value.

In some embodiments, after the first video feature vector is extracted from the target video and the index distribution of the first quantization feature vector in the discrete hidden space composed on the basis of the first quantization feature vector is determined, each frame of image in the target video can be represented either by the first quantization feature vector $f_q$ or by the index of the first quantization feature vector $f_q$ in the discrete hidden space.

Step 306: Input the Second Video Feature Vector and the Index Distribution to a Transformation Model to Obtain a Target Index Corresponding to the Masked Region.

The transformation model is a machine learning model used for determining an index corresponding to the masked region of the target video.

An index is used for representing a position of a quantization feature vector, that is, the index may be used for determining a position of a quantization feature vector corresponding to the index. A position of a second quantization feature corresponding to the masked region in the discrete hidden space may be determined according to the target index.

The computer device inputs the second video feature vector and the index distribution to the transformation model to obtain the target index corresponding to the masked region.

In one possible implementation, the computer device inputs the second video feature vector and the index distribution to the transformation model, and calculates a response value between the second video feature vector and an index feature vector transformed from the index distribution. The computer device takes an index corresponding to the index feature vector having the largest response value as the target index.

The response value refers to a correlation value between the second video feature vector of the masked region and the index feature vector transformed from the index distribution. The index feature vector may be a feature vector obtained by transforming the index distribution through a self-attention mechanism layer in the transformation model. A larger response value indicates a higher possibility of using the quantization feature vector corresponding to the index as the second quantization feature vector. Therefore, in this embodiment, it can be understood that the second quantization feature vector is determined by classification, and each of candidate second quantization feature vectors can be considered as a category. The process of calculating the response value is a process of predicting a classification possibility of each category. In this way, the video filling is transformed into classification in the discrete hidden space, which lowers the difficulty of video completion and improves the filling efficiency.

For example, the computer device transforms the index distribution into an index feature vector by using the self-attention mechanism layer in the transformation model, calculates a response value $s_i^t$, between the second video feature vector and the index feature vector transformed from the index distribution by using a prediction layer in the transformation model, then performs normalization using a softmax function to obtain a maximum response value $c_i^t$ between the second video feature vector and the first quantization feature vector in the discrete hidden space, and determines a target index corresponding to the masked region according to the maximum response value.

In one possible implementation, a formula for determining the response value $s_i^t$ between the second video feature vector and the index feature vector transformed from the index distribution is:

$$s_i^t = P(\text{MSA}(z))$$

where MSA is the self-attention mechanism layer in the transformation model; P is the prediction layer in the transformation model; and z is the index distribution.

A formula for determining the maximum response value $c_i^t$ is:

$$c_i^t = \text{softmax}(s_i^t)$$

A formula for determining the target index is:

$$z_i^t = \underset{k}{\arg\max}(c_i^t)_k$$

wherein $z_i^t$ represents an index corresponding to an $i^{th}$ quantization feature vector in the $t^{th}$ frame; k is the quantity of the quantization feature vectors in the discrete hidden space; and $c_i^t$ is the maximum response value between the second video feature vector and the index feature vector transformed from the index distribution.

Step 308: Determine, in the Discrete Hidden Space According to the Target Index, the Second Quantization Feature Vector Corresponding to the Target Index.

The computer device determines, according to the target index, a position of a quantization feature vector corresponding to the target index, to determine, from the discrete hidden space, a second quantization feature vector corresponding to the target index.

Step 310: Input the First Quantization Feature Vector and the Second Quantization Feature Vector to the Decoding Model to Obtain a Reconstructed Video.

Exemplarily, the computer device inputs the first quantization feature vector and the second quantization feature vector to the decoding model, and completes the masked region of the target video using the second quantization feature vector to obtain a reconstructed video x'.

Figure 4:
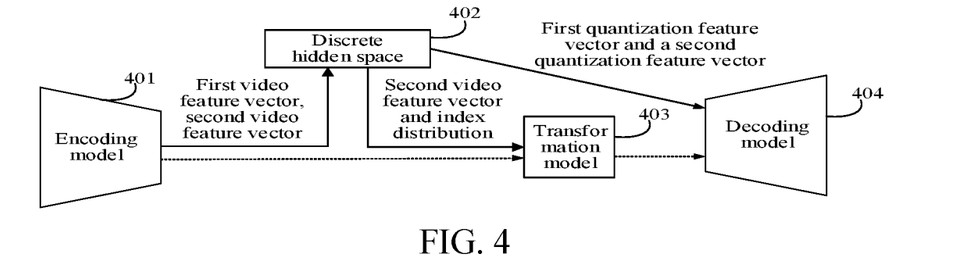
FIG. 4 is a structural block diagram of a video processing method provided by an exemplary embodiment of this application.

In one possible implementation, as shown in FIG. 4, the computer device obtains a target video and a video mask, and the computer device inputs the target video and the video mask to an encoding model 401 for feature extraction to obtain a first video feature vector and a second video feature vector. The computer device determines, according to the first video feature vector, an index distribution of the first quantization feature vector in a discrete hidden space 402 composed on the basis of the first quantization feature vector.

The computer device inputs the second video feature vector and the index distribution to a transformation model 403, and calculates, through the transformation model 403, a response value between the second video feature vector and an index feature vector transformed from the index distribution. The computer device takes the index that is output by the transformation model and corresponds to the index feature vector having the largest response value as the target index. The computer device determines, according to the target index, a position of a quantization feature vector corresponding to the target index, to determine, from the discrete hidden space 402, a second quantization feature vector corresponding to the target index.

The computer device inputs the first quantization feature vector and the second quantization feature vector to a decoding model 404, and completes a masked region of the target video using the second quantization feature vector to obtain a reconstructed video x'.

In one possible implementation, before inputting the first quantization feature vector and the second quantization feature vector to the decoding model, the computer device inputs the second quantization feature vector to a timing sequence integration model, calculates a timing sequence residual of the second quantization feature vector on the basis of the second quantization feature vector between adjacent frames of the target video, and updates the second quantization feature vector on the basis of the timing sequence residual to obtain an updated second quantization feature vector. The computer device inputs the updated second quantization feature vector and the first quantization feature vector to a decoding model to obtain a reconstructed video. By utilizing a timing sequence relationship between adjacent frames, the second quantization feature vector is updated, so that a filling content of a filled region between adjacent frames is smoother, thus making a filling result more coherent and natural.

Further, after obtaining the reconstructed video, the computer device may save or output the reconstructed video.

Figure 5:
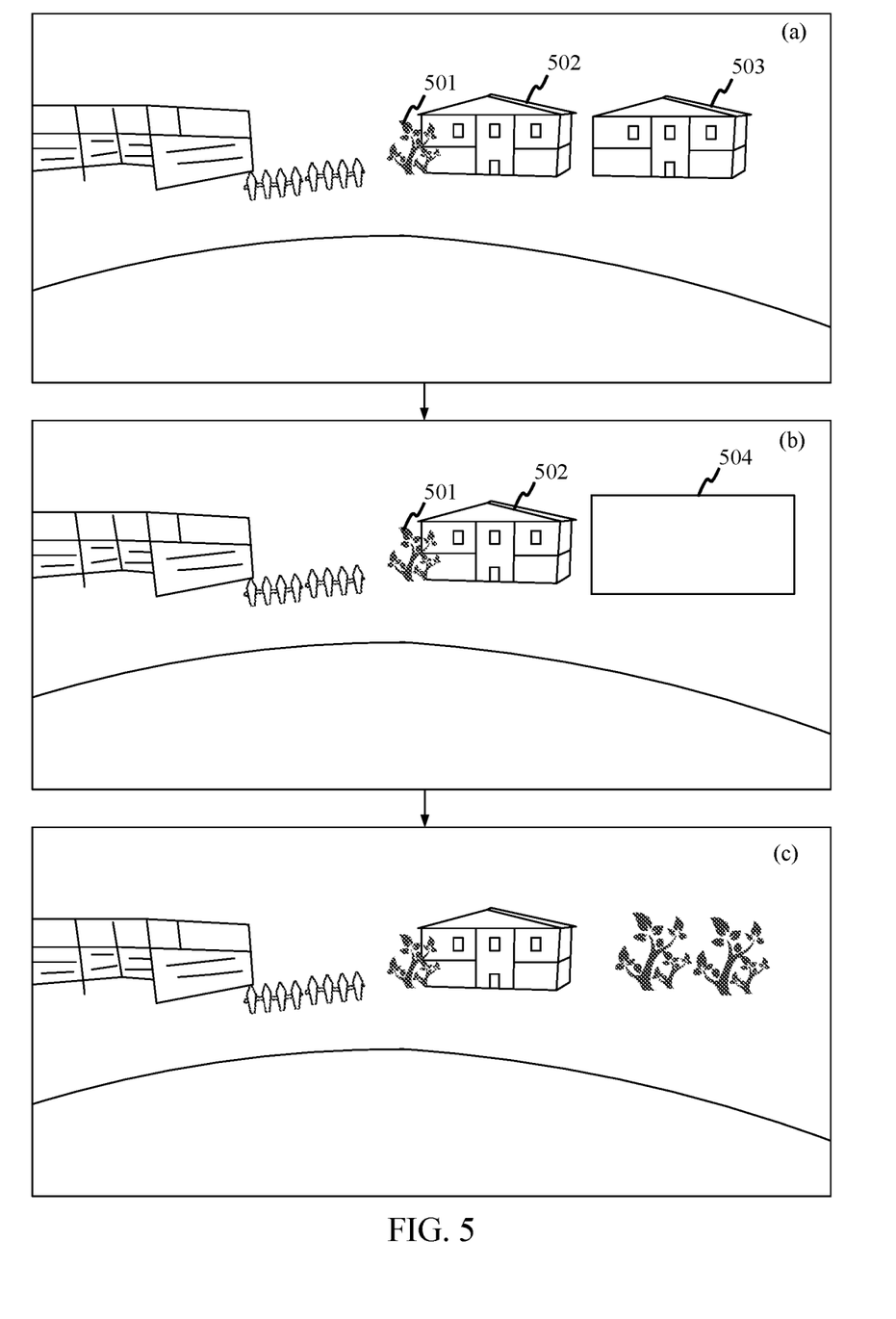
FIG. 5 is a schematic diagram of a video processing method provided by one exemplary embodiment of this application.

Exemplarily, as shown in FIG. 5, FIG. 5 shows a schematic diagram of video processing by a computer device. FIG. 5(a) s a frame of image in a target video. A virtual tree 501, a virtual hose 502, and a virtual house 503 in FIG. 5(a) are taken as an example. In a case that it is necessary to eliminate the virtual house 503 in FIG. 5(a) and perform filling, FIG. 5(a) and a video mask are inputted to an encoding model for feature extraction, and first video feature vectors of corresponding positions of the virtual tree 501 and the virtual house 502 and a second video feature vector of a corresponding position of the virtual house 503 are obtained. The computer device obtains a first quantization feature vector corresponding to the first video feature vector of the target video, and determines an index distribution of the first quantization feature vector in a discrete hidden space formed on the basis of the first quantization feature vector.

In a case of inputting the obtained first video feature vector and second video feature vector to a decoding model, the virtual tree 501, the virtual hose 502 and a video-masked blank region 504 in FIG. 5(b) after the decoding model performs decoding.

In a case of inputting the obtained index distribution and the second video feature vector to a transformation model, the transformation model calculates a response value between the second video feature vector and an index feature vector transformed from the index distribution. The computer device takes an index corresponding to the index feature vector having the largest response value as the target index. The computer device determines, from the discrete hidden space according to the target index, a position of a quantization feature vector corresponding to the target index, to determine, from the discrete hidden space, a second quantization feature vector corresponding to the target index.

For example, the transformation model calculates a response value between the second video feature vector of the corresponding position of the virtual house 503 and the index feature vector transformed from the index distribution, and determines the index corresponding to the index feature vector having the largest response value as the target index. The computer device determines, from the discrete hidden space according to the target index, that the second quantization feature vector corresponding to the target index is the virtual tree 501. The computer device inputs the first quantization feature vector and the second quantization feature vector to the decoding model, and completes the masked region of the target video using the second quantization feature vector to obtain a reconstructed video. That is, the computer device inputs the first quantization feature vectors corresponding to the virtual tree 501 and the virtual house 502, and the second quantization feature vector corresponding to the virtual house 503 to the decoding model, and fills the video-masked blank region 504 using the second quantization feature vector to obtain the reconstructed video, as shown in FIG. 5(c).

It can be understood that this embodiment of this application can be applied to various scenarios such as a cloud technology, artificial intelligence, intelligent transportation, and assisted driving.

In summary, the solution shown in this embodiment of this application obtains the first video feature vector and the second video feature vector by inputting the obtained target video and the video mask to the encoding model for feature extraction, and determines the index distribution of the first quantization feature vector in the discrete hidden space composed on the basis of the first quantization feature vector; inputs the second video feature vector and the index distribution to the transformation model to obtain the target index corresponding to the masked region, and determines the second quantization feature vector in the discrete hidden space according to the target index; and inputs the first quantization feature vector and the second quantization feature vector to the decoding model to obtain the reconstructed video. Since the transformation model can be used to calculate the response value between the second video feature vector and the index feature vector transformed from the index distribution to obtain the target index corresponding to the masked region, the target index improves the efficiency of video filling.

The above embodiments have described a video processing process. Processes of determining the encoding model, the discrete hidden space, and the decoding model corresponding to the target video during the video processing will be further described below.

Figure 6:
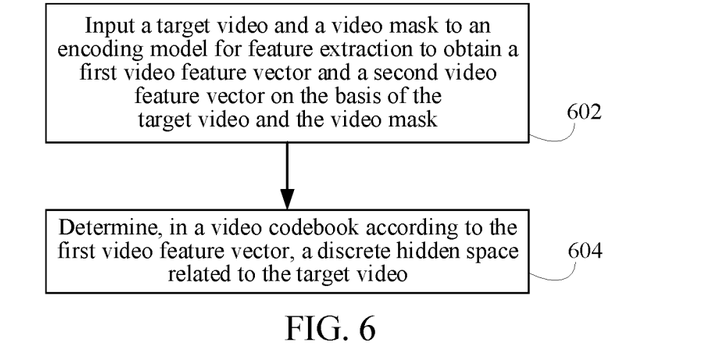
FIG. 6 is a flowchart of a video processing method provided by an exemplary embodiment of this application.

FIG. 6 is a flowchart of a video processing method provided by an exemplary embodiment of this application. The method may be implemented by a computer device, and the computer device may be the terminal 100 or the server 200 in FIG. 1. Parts included in this embodiment that are the same as those in the previous embodiment can refer to the explanation in the previous embodiment. Specifically, the video processing method may include the following steps:

Step 602: Input a Target Video and a Video Mask to an Encoding Model for Feature Extraction, and Obtain a First Video Feature Vector and a Second Video Feature Vector on the Basis of the Target Video and the Video Mask.

In one possible implementation, the computer device inputs, to the encoding model for feature extraction, a masked video obtained after multiplying the target video with the video mask, and obtains the first video feature vector and the second video feature vector.

Step 604: Determine, in a Video Codebook According to the First Video Feature Vector, a Discrete Hidden Space Related to the Target Video.

The video codebook includes a set of quantization feature vectors corresponding to various videos.

It can be understood that the video codebook may be obtained from a database that is public in a network, or corresponding quantization features are obtained by using videos public in the network, to construct the video codebook.

The computer device determines, from the video codebook according to spatial positions between each first video feature vector and the quantization feature vectors in the video codebook, a quantization feature vector having a distance value satisfying a distance condition to the first video feature vector, and takes a vector space composed of a set of quantization feature vectors having minimum distance values to the first video feature vector as the discrete hidden space. The distance condition here refers to a condition used for limiting a distance to the first video feature vector. For example, the condition may be at least one of the following: a distance value is minimum or a distance value is less than a preset distance threshold.

Figure 7:
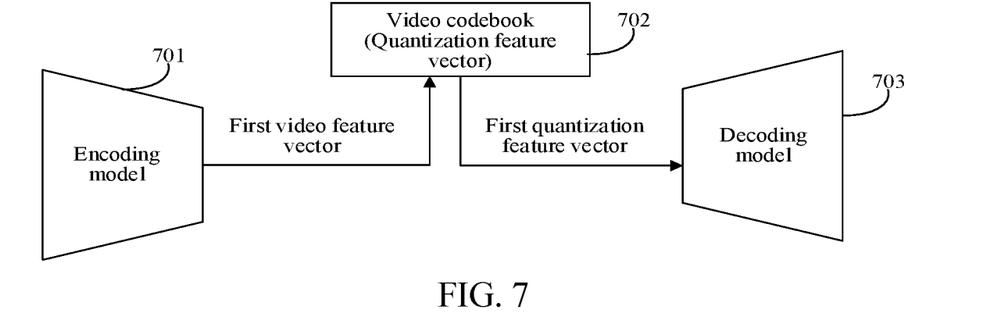
FIG. 7 is a structural block diagram of a video processing method provided by an exemplary embodiment of this application.

In one possible implementation, as shown in FIG. 7, the computer device obtains a target video and a video mask, and the computer device inputs a masked video obtained by multiplying the target video with the video mask to an encoding model 701 for feature extraction to obtain a first video feature vector. The computer device determines, from a video codebook 702 according to spatial positions between the first video feature vector and quantization feature vectors in the video codebook, a first quantization feature vector having a minimum distance value to the first video feature vector, and integrates the first quantization feature vectors having the minimum distance value to the first video feature vector to obtain a discrete hidden space. The computer device may further input the quantization feature vectors to a decoding model 703 to obtain a video with an incomplete masked region.

In one possible implementation, the computer device calculates a loss value of the encoding model on the basis of the first video feature vector of the target video and the first quantization feature vector corresponding to the first video feature vector. The computer device updates model parameters of the encoding model according to the loss value to obtain the encoding model corresponding to the target video.

In one possible implementation, the computer device calculates a loss value of the decoding model on the basis of the first video feature vector of the target video and the first quantization feature vector corresponding to the first video feature vector, and updates model parameters of the decoding model according to the loss value to obtain the decoding model corresponding to the target video.

In one possible implementation, a formula for calculating the loss values $\pounds_{vq}$ of the encoding model and the decoding model is:

$$\pounds_{vq} = \frac{1}{n}\sum \|(x-x')\odot(1-m)\|^2 + \gamma_1\|e_k - sg[E(x)]\| + \gamma_2\|E(x) - sg[e_k]\|$$

where sg represents a stop gradient backhaul; $\gamma_1$ and $\gamma_2$ represent weight values; n is a total number of pixel points of an unmasked region in the target video; x is a video inputted to the encoding model; x' is a video outputted by the decoding model; m is a video mask; $e_k$ is a quantization feature vector; and E(x) is a video feature vector.

In summary, the video processing method provided in this embodiment of this application obtains, on the basis of the first quantization feature vector corresponding to the unmasked region, the discrete hidden space related to the target video from the video codebook, so that the discrete hidden space pays more attention to the target video. Therefore, when the quantization feature vectors are obtained from the discrete hidden space for filling, a filling content better matches the target video, and the video filling effect is better. In addition, by calculating the loss values of the encoding model and the decoding model, the computer device can update the model parameters of the encoding model and the decoding model according to the loss values, thereby obtaining the encoding model and decoding model corresponding to the target video, ensuring the accuracy of the encoding model and the decoding model and further improving the video filling effect.

Figure 8:
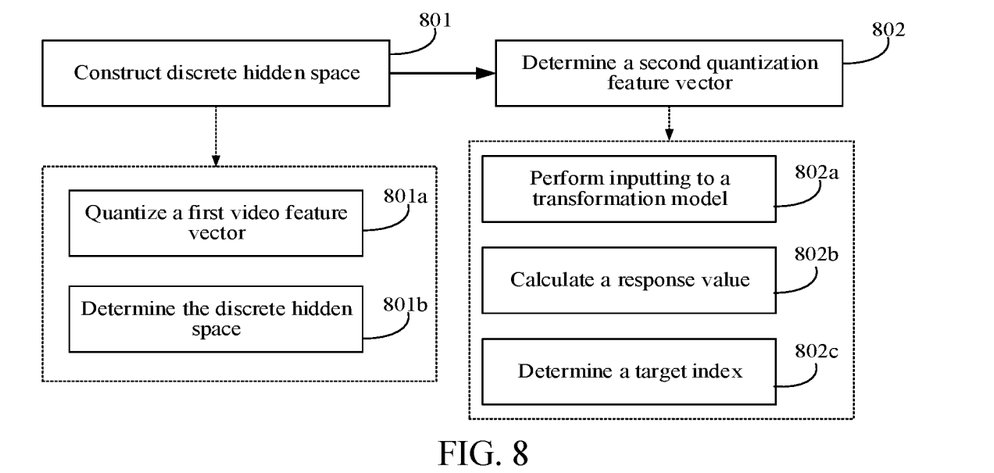
FIG. 8 is a structural block diagram of a video processing method provided by an exemplary embodiment of this application.

FIG. 8 is a flowchart of a video processing method provided by an exemplary embodiment of this application. The method may be implemented by a computer device, and the computer device may be the terminal 100 or the server 200 in FIG. 1. The flowchart of the video processing method may include the following steps:

Main steps of the video processing method include constructing a discrete hidden space 801 and determining a second quantization feature vector 802.

The constructing a discrete hidden space 801 includes quantizing a first video feature vector 801*a* and determining a discrete hidden space 801*b*.

The computer device obtains a target video and a video mask. The computer device inputs the target video and the video mask to an encoding model for feature extraction and obtains a first video feature vector and a second video feature vector on the basis of the target video and the video mask.

The computer device determines, from a video codebook according to spatial positions between the first video feature vector and quantization feature vectors in the video codebook, a quantization feature vector having a minimum distance value to the first video feature vector to achieve quantization of the first video feature vector. The computer device integrates the quantization feature vectors having the minimum distance value to the first video feature vector to obtain a discrete hidden space. The discrete hidden space includes the quantization feature vectors corresponding to the first video feature vector of the target video.

Specific descriptions of quantizing a first video feature vector 801*a* and determining a discrete hidden space 801*b* can refer to steps 602 and 604 of the aforementioned embodiments, and will not be repeated here.

The determining a second quantization feature vector 802 includes performing inputting to a transformation model 802*a*, calculating a response value 802*b*, and determining a target index 802*c*.

The computer device obtains a target video and a video mask. The computer device inputs the target video and the video mask to an encoding model for feature extraction and obtains a first video feature vector and a second video feature vector on the basis of the target video and the video mask.

The computer device determines, according to the first video feature vector, an index distribution of the first quantization feature vector in a discrete hidden space composed on the basis of the first quantization feature vector.

The computer device inputs the second video feature vector and the index distribution to a transformation model, and calculates a response value between the second video feature vector and an index feature vector transformed from the index distribution. The computer device takes an index corresponding to the index feature vector having the largest response value as the target index, thereby determining the target index 802*c*.

The computer device determines, according to the target index, a position of a quantization feature vector corresponding to the target index, to determine, from the discrete hidden space, a second quantization feature vector corresponding to the target index.

A specific description of the step of determining a second quantization feature vector 802 can refer to the descriptions of step 304 to step 308 of the aforementioned embodiments, and will not be repeated here.

The aforementioned embodiments have described a video processing process and the processes of determining the encoding model, the discrete hidden space, and the decoding model corresponding to the target video. The processes of determining the encoding model, the decoding model, and the transformation model will be further described below.

The computer device obtains a target video sample, a video mask sample, and a missing video sample. The computer device inputs a masked video obtained after multiplying the target video sample with the video mask sample to the encoding model for feature extraction, and obtains a first video feature vector and a second video feature vector on the basis of the target video sample and the video mask sample.

The computer device determines, from a video codebook according to spatial positions between the first video feature vector and quantization feature vectors in a discrete hidden space, a first quantization feature vector having a minimum distance value to the first video feature vector.

The computer device inputs the first quantization feature vector to the decoding model for loop iteration to obtain a missing video.

The computer device calculates loss values of the encoding model and the decoding model on the basis of an error between the missing video and the missing video sample, the first video feature vector, and the first quantization feature vector, and the computer device trains model parameters of the encoding model and the decoding model according to the loss values, to obtain a trained encoding model and decoding model.

In one possible implementation, the computer device obtains a target video sample, a video mask sample, and a reconstructed video sample. The computer device inputs a masked video obtained after multiplying the target video sample with the video mask sample to the encoding model for feature extraction, obtains a first video feature vector on the basis of the target video sample and the video mask sample, and obtains a second video feature vector on the basis of the video mask sample.

The computer device determines, according to the first video feature vector, an index distribution of the first quantization feature vector in a discrete hidden space composed on the basis of the first quantization feature vector.

The computer device inputs the second video feature vector and the index distribution to the transformation model to obtain the target index corresponding to the masked region.

The computer device determines, according to the target index, a position of a quantization feature vector corresponding to the target index, to determine, from the discrete hidden space, a second quantization feature vector corresponding to the target index.

The computer device inputs the first quantization feature vector and the second quantization feature vector to the decoding model, and completes the masked region of the target video using the second quantization feature vector to obtain a reconstructed video.

The computer device calculates a loss value of the transformation model on the basis of an error between the reconstructed video and the reconstructed video sample, the first video feature vector, and the first quantization feature vector, and the computer device trains the to-be-trained transformation model according to the calculated loss value, to obtain a trained transformation model.

In one specific embodiment, a video processing method is provided. The method can be implemented by a computer device. The computer device can be the terminal 100 or the server 200 in FIG. 1. Parts included in this embodiment that are the same as those in the previous embodiment can refer to the explanation in the previous embodiment. Specifically, the video processing method may include the following steps:

1. For various to-be-processed images in a target video, the computer device multiplies these to-be-processed images with a video mask pixel by pixel to obtain mask images of the various to-be-processed images. Image regions needing to be filled in the mask images are blocked to obtain masked regions, while the pixels in other regions remain unchanged. As unmasked regions, the masked images are inputted to a trained encoder for feature extraction, to obtain video feature maps of the various to-be-processed images, and first video feature vectors corresponding to the unmasked regions and second video feature vectors corresponding to the masked regions may be obtained according to these video feature maps. For example, for pixel points in an unmasked region, feature values of various channels corresponding to the pixel points are combined to form the first video feature vectors.

2. The computer device queries, from a video codebook, quantization feature vectors closest to the video feature vectors (including the first video feature vectors and the second video feature vectors) of the various pixels in each video feature map. These quantization feature vectors form a discrete hidden space. A target codebook matched with the target video is reconstructed according to these quantization feature vectors. In the target codebook, correspondence relationships between the various quantization feature vectors and index values are established.

3. The computer device constructs respective index maps of the various video feature maps according to the index values of the various quantization feature vectors in the target codebook. The index maps corresponding to the video feature maps have the same sizes as the sizes of the video feature maps, and pixel values of various pixel positions in the index maps are the index values at the same pixel positions in the video feature maps.

In order to enable the transformation model to distinguish a masked region from an unmasked region, the quantization feature vectors corresponding to masked regions in the target codebook are unified, so that the values corresponding to the masked regions in the index maps are fixed.

4. The computer device inputs the video feature maps and the index maps together to the trained transformation model, so that for each pixel position in the masked region, the transformation model can predict a response value of the pixel position corresponding to the various index values in the target codebook. An index value with the largest response value is taken as a target index value of the pixel position, and the corresponding quantization feature vector can be queried from the target codebook according to the target index value, that is, a second quantization feature vector corresponding to the pixel position.

5. The computer device inputs the first quantization feature vectors and the second quantization feature vectors to the decoding model. The decoding model can reconstruct, on the basis of the first quantization feature vectors, images containing the masked regions, and fill the masked regions on the basis the second quantization feature vectors to obtain filled images. Finally, a reconstructed video can be obtained on the basis of the various filled images.

It is understood that although the steps in the flowcharts of the various embodiments mentioned above are displayed in sequence according to the instructions of the arrows, these steps are not necessarily performed in sequence according to the sequence indicated by the arrows. Unless otherwise explicitly specified in this application, execution of the steps is not strictly limited, and the steps may be performed in other sequences. Moreover, at least some of the steps in the flowcharts of the various embodiments may include a plurality of steps or a plurality of stages. These steps or stages are not necessarily performed at the same moment but may be performed at different moments. Execution of these steps or stages is not necessarily performed in sequence, but may be performed in turn or alternately with other steps or at least some of steps or stages of other steps.

Figure 9:
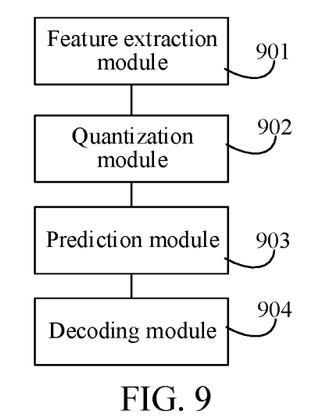
FIG. 9 is a structural block diagram of a video processing apparatus provided by an exemplary embodiment of this application.

FIG. 9 is a block diagram of a video processing apparatus provided by an exemplary embodiment of this application. As shown in FIG. 9, the video processing apparatus includes:

a feature extraction module 901, configured to: input a target video and a video mask to an encoding model for feature extraction, and obtain a first video feature vector and a second video feature vector on the basis of the target video and the video mask, the video mask being used for masking the target video to obtain a masked region, the first video feature vector referring to a feature vector corresponding to an unmasked region, and the second video feature vector referring to a feature vector corresponding to the masked region;

a quantization module 902, configured to: obtain a first quantization feature vector corresponding to the first video feature vector of the target video, and determine an index distribution of the first quantization feature vector in a discrete hidden space formed on the basis of the first quantization feature vector, the index distribution being used for indicating a position distribution of the first quantization feature vector in the discrete hidden space;

a prediction module 903, configured to determine a second quantization feature vector in the discrete hidden space on the basis of the second video feature vector and the index distribution, the second quantization feature vector being used for filling the masked region; and a decoding module 904, configured to input the first quantization feature vector and the second quantization feature vector to a decoding model to obtain a reconstructed video, the reconstructed video referring to a video obtained by filling a content of the masked region of the target video.

In summary, the solution shown in this embodiment of this application obtains the first video feature vector and the second video feature vector by inputting the obtained target video and the video mask to the encoding model for feature extraction, and determines the index distribution of the first quantization feature vector in the discrete hidden space composed on the basis of the first quantization feature vector. The computer device determines the second quantization feature vector in the discrete hidden space on the basis of the second video feature vector and the index distribution, and inputs the first quantization feature vector and the second quantization feature vector to the decoding model to obtain the reconstructed video. The second quantization feature vector is determined from the discrete hidden space, and the discrete hidden space is composed of the first quantization feature vector corresponding to the unmasked region in the target video, which conforms to representation of the target video. Therefore, the target video can be filled with a content that better matches the unmasked region, to obtain a natural and harmonious high-quality video, thereby improving the video filling effect. In addition, in this application, the second quantization feature vector is obtained from the discrete hidden space for video filling, which reduces the difficulty of video filling implementation and improves the efficiency of video filling.

In one possible implementation, the prediction module 903 is further configured to input the second video feature vector and the index distribution to a transformation model to obtain a target index corresponding to the masked region.

In one possible implementation, the prediction module 903 is further configured to determine, in the discrete hidden space according to the target index, the second quantization feature vector corresponding to the target index, the transformation model being a machine learning model used for determining an index corresponding to the masked region of the target video.

In one possible implementation, the prediction module 903 is further configured to: input the second video feature vector and the index distribution to the transformation model, and calculate a response value between the second video feature vector and an index feature vector transformed from the index distribution.

In one possible implementation, the prediction module 903 is further configured to take the index corresponding to the index feature vector having the largest response value as the target index, the response value referring to a correlation value between the second video feature vector and the index feature vector transformed from the index distribution.

In one possible implementation, the feature extraction module 901 is further configured to: input, to the encoding model for feature extraction, a masked video obtained after multiplying the target video with the video mask, and obtain the first video feature vector and the second video feature vector on the basis of the target video and the video mask.

In one possible implementation, the prediction module 903 is further configured to: determine, in the discrete hidden space composed on the basis of the first quantization feature vector, a position distribution of the first quantization feature vector in the discrete hidden space according to relative spatial position relationships between the first quantization feature vector and other first quantization feature vectors in the discrete hidden space.

In one possible implementation, the quantization module 902 is further configured to determine, from a video codebook according to spatial positions between the first video feature vector and quantization feature vectors in the video codebook, a quantization feature vector having a minimum distance value to the first video feature vector as the first quantization feature vector, the video codebook including the quantization feature vectors corresponding to various videos.

In one possible implementation, the apparatus further includes an update module, configured to calculate a loss value of the encoding model on the basis of the first video feature vector of the target video and the first quantization feature vector corresponding to the first video feature vector, and update model parameters of the encoding model according to the loss value to obtain the encoding model corresponding to the target video, the encoding model being used for extracting feature vectors of the target video and the video mask.

In one possible implementation, the update module is further configured to: calculate a loss value of the decoding model on the basis of the first video feature vector of the target video and the first quantization feature vector corresponding to the first video feature vector, and update model parameters of the decoding model according to the loss value to obtain the decoding model corresponding to the target video, the decoding model being used for transforming quantization feature vectors into a video form.

In one possible implementation, the update module is further configured to: input the second quantization feature vector to a timing sequence integration model, and calculate a timing sequence residual of the second quantization feature vector on the basis of the second quantization feature vector between adjacent frames of the target videos; and update the second quantization feature vector according to the timing sequence residual to obtain an updated second quantization feature vector.

Figure 10:
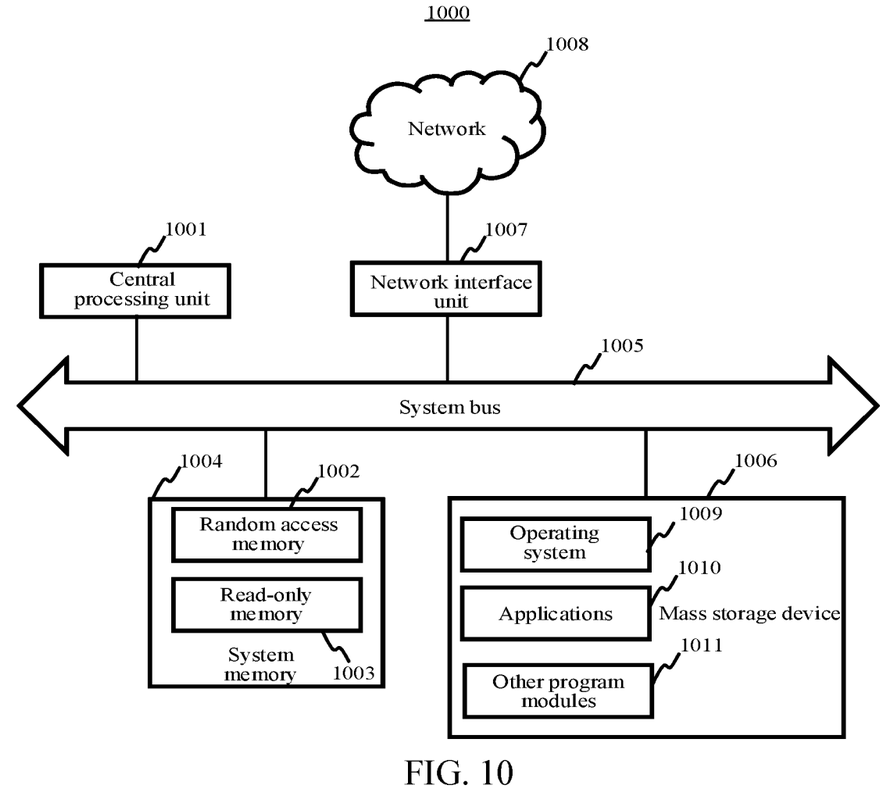
FIG. 10 is a structural block diagram of a computer device provided by an exemplary embodiment of this application.

In one possible implementation, the decoding module 904 is further configured to input the updated second quantization feature vector and the first quantization feature vector to the decoding model to obtain the reconstructed video. FIG. 10 is a structural block diagram of a computer device 1000 provided by an exemplary embodiment of this application. The computer device can be implemented as the server in the above solution of this application. The computer device 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The computer device 1000 further includes a mass storage device 1006 configured to store an operating system 1009, applications 1010, and other program modules 1011.

The mass storage device 1006 is connected to the CPU 1001 by using a mass storage controller (not shown) connected to the system bus 1005. The mass storage device 1006 and a computer-readable medium associated with the mass storage device provide non-volatile storage for the computer device 1000. That is, the mass storage device 1006 may include a computer-readable medium (not shown) such as a hard disk or a compact disc ROM (CD-ROM) drive.

In general, the computer-readable medium may include a non-transitory computer-readable storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state storage, a CD-ROM, a digital versatile disc (DVD) or another optical storage, a tape cartridge, a magnetic cassette, a magnetic disk storage, or another magnetic storage device. Certainly, a person skilled in the art may learn that the computer storage medium is not limited to the foregoing several types. The system memory 1004 and the mass storage device 1006 described above may be referred to collectively as memory.

According to the various embodiments of this application, the computer device 1000 may further be connected, through a network such as the Internet, to a remote computer on the network and run. That is, the computer device 1000 may be connected to a network 1008 by using a network interface unit 1007 connected to the system bus 1005, or may be connected to another type of network or a remote computer system (not shown) by using a network interface unit 1007.

The memory also includes at least one computer-readable instruction stored in the memory. The CPU 1001 implements all or some of the steps in the video processing methods shown in the above embodiments by executing the at least one program.

In one embodiment, a computer-readable storage medium is provided. The computer-readable storage medium stores a computer program. The computer program, when executed by a processor, execute the steps of the above video processing method.

In one embodiment, a computer program product is provided, including a computer program. The computer program, when executed by a processor, execute the steps of the above video processing method.

It is noted that, User information (including but not limited to user device information and user personal information) and data (including but not limited to data for analysis, stored data, displayed data, and the like) involved in this application are information and data authorized by a user or fully authorized by all parties, and the acquisition, use, and processing of the relevant data need to comply with relevant laws, regulations, and standards of relevant countries and regions. The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The foregoing embodiments merely express several implementations of this application. The descriptions thereof are relatively specific and detailed, but are not understood as limitations on the scope of this application. A person of ordinary skill in the art can also make several transformations and improvements without departing from the idea of this application. These transformations and improvements fall within the protection scope of this application. Therefore, the protection scope of the patent of this application shall be subject to the appended claims.

What is claimed is:

1. A video processing method performed by a computer device and the method comprising:
inputting a target video and a video mask to an encoding model for feature extraction to obtain a first video feature vector corresponding to an unmasked region and a second video feature vector corresponding to a masked region, the video mask masking the target video to obtain the masked region;
obtaining a first quantization feature vector corresponding to the first video feature vector of the target video, and determining an index distribution of the first quantization feature vector in a discrete hidden space formed on the basis of the first quantization feature vector;
determining a second quantization feature vector in the discrete hidden space on the basis of the second video feature vector and the index distribution; and
inputting the first quantization feature vector and the second quantization feature vector to a decoding model to obtain a reconstructed video, the reconstructed video referring to a video with a content of the masked region of the target video filled in accordance with the second quantization feature vector.

2. The method according to claim 1, wherein the determining a second quantization feature vector in the discrete hidden space on the basis of the second video feature vector and the index distribution comprises:

inputting the second video feature vector and the index distribution to a transformation model to obtain a target index corresponding to the masked region; and determining, in the discrete hidden space according to the target index, the second quantization feature vector corresponding to the target index, the transformation model being a machine learning model used for determining an index corresponding to the masked region of the target video.

3. The method according to claim 2, wherein the inputting the second video feature vector and the index distribution to a transformation model to obtain a target index corresponding to the masked region comprises:

inputting the second video feature vector and the index distribution to the transformation model, and calculating a response value between the second video feature vector and an index feature vector transformed from the index distribution; and taking the index corresponding to the index feature vector having the largest response value as the target index, the response value referring to a correlation value between the second video feature vector and the index feature vector transformed from the index distribution.

4. The method according to claim 1, wherein the inputting a target video and a video mask to an encoding model for feature extraction, and obtaining a first video feature vector and a second video feature vector on the basis of the target video and the video mask comprises:

inputting, to the encoding model for feature extraction, a masked video obtained after multiplying the target video with the video mask, and obtaining the first video feature vector and the second video feature vector on the basis of the target video and the video mask.

5. The method according to claim 1, wherein the determining an index distribution of the first quantization feature vector in a discrete hidden space composed on the basis of the first quantization feature vector comprises:

determining, in the discrete hidden space composed on the basis of the first quantization feature vector, a position distribution of the first quantization feature vector in the discrete hidden space according to relative spatial position relationships between the first quantization feature vector and other first quantization feature vectors in the discrete hidden space.

6. The method according to claim 1, wherein the obtaining a first quantization feature vector corresponding to the first video feature vector of the target video comprises:

determining, from a video codebook according to spatial positions between the first video feature vector and quantization feature vectors in the video codebook, a quantization feature vector having a distance value satisfying a distance condition to the first video feature vector as the first quantization feature vector, the video codebook comprising the quantization feature vectors corresponding to various videos.

7. The method according to claim 1, wherein the method further comprises:

inputting the second quantization feature vector to a timing sequence integration model, and calculating a timing sequence residual of the second quantization feature vector on the basis of the second quantization feature vector between adjacent frames of the target videos;

updating the second quantization feature vector according to the timing sequence residual to obtain an updated second quantization feature vector; and inputting the updated second quantization feature vector and the first quantization feature vector to the decoding model to obtain the reconstructed video.

8. A computer device, comprising a memory and a processor, the memory storing computer-readable instructions that, when executed by the processor, cause the computer device to implement a video processing method, the method including:

inputting a target video and a video mask to an encoding model for feature extraction to obtain a first video feature vector corresponding to an unmasked region and a second video feature vector corresponding to a masked region, the video mask masking the target video to obtain the masked region;

obtaining a first quantization feature vector corresponding to the first video feature vector of the target video, and determining an index distribution of the first quantization feature vector in a discrete hidden space formed on the basis of the first quantization feature vector;

determining a second quantization feature vector in the discrete hidden space on the basis of the second video feature vector and the index distribution; and inputting the first quantization feature vector and the second quantization feature vector to a decoding model to obtain a reconstructed video, the reconstructed video referring to a video with a content of the masked region of the target video filled in accordance with the second quantization feature vector.

9. The computer device according to claim 8, wherein the determining a second quantization feature vector in the discrete hidden space on the basis of the second video feature vector and the index distribution comprises:

inputting the second video feature vector and the index distribution to a transformation model to obtain a target index corresponding to the masked region; and determining, in the discrete hidden space according to the target index, the second quantization feature vector corresponding to the target index, the transformation model being a machine learning model used for determining an index corresponding to the masked region of the target video.

10. The computer device according to claim 9, wherein the inputting the second video feature vector and the index distribution to a transformation model to obtain a target index corresponding to the masked region comprises:

inputting the second video feature vector and the index distribution to the transformation model, and calculating a response value between the second video feature vector and an index feature vector transformed from the index distribution; and taking the index corresponding to the index feature vector having the largest response value as the target index, the response value referring to a correlation value between the second video feature vector and the index feature vector transformed from the index distribution.

11. The computer device according to claim 8, wherein the inputting a target video and a video mask to an encoding model for feature extraction, and obtaining a first video feature vector and a second video feature vector on the basis of the target video and the video mask comprises:

inputting, to the encoding model for feature extraction, a masked video obtained after multiplying the target video with the video mask, and obtaining the first video feature vector and the second video feature vector on the basis of the target video and the video mask.

12. The computer device according to claim 8, wherein the determining an index distribution of the first quantization feature vector in a discrete hidden space composed on the basis of the first quantization feature vector comprises:
determining, in the discrete hidden space composed on the basis of the first quantization feature vector, a position distribution of the first quantization feature vector in the discrete hidden space according to relative spatial position relationships between the first quantization feature vector and other first quantization feature vectors in the discrete hidden space.

13. The computer device according to claim 8, wherein the obtaining a first quantization feature vector corresponding to the first video feature vector of the target video comprises:
determining, from a video codebook according to spatial positions between the first video feature vector and quantization feature vectors in the video codebook, a quantization feature vector having a distance value satisfying a distance condition to the first video feature vector as the first quantization feature vector,
the video codebook comprising the quantization feature vectors corresponding to various videos.

14. The computer device according to claim 8, wherein the method further comprises:
inputting the second quantization feature vector to a timing sequence integration model, and calculating a timing sequence residual of the second quantization feature vector on the basis of the second quantization feature vector between adjacent frames of the target videos;
updating the second quantization feature vector according to the timing sequence residual to obtain an updated second quantization feature vector; and
inputting the updated second quantization feature vector and the first quantization feature vector to the decoding model to obtain the reconstructed video.

15. A non-transitory computer-readable storage medium, storing computer-readable instructions, the computer-readable instructions, when executed by a processor of a computer device, causing the computer device to implement a video processing method, the method including:
inputting a target video and a video mask to an encoding model for feature extraction to obtain a first video feature vector corresponding to an unmasked region and a second video feature vector corresponding to a masked region, the video mask masking the target video to obtain the masked region;
obtaining a first quantization feature vector corresponding to the first video feature vector of the target video, and determining an index distribution of the first quantization feature vector in a discrete hidden space formed on the basis of the first quantization feature vector;
determining a second quantization feature vector in the discrete hidden space on the basis of the second video feature vector and the index distribution; and
inputting the first quantization feature vector and the second quantization feature vector to a decoding model to obtain a reconstructed video, the reconstructed video referring to a video with a content of the masked region of the target video filled in accordance with the second quantization feature vector.

16. The non-transitory computer-readable storage medium according to claim 15, wherein the determining a second quantization feature vector in the discrete hidden space on the basis of the second video feature vector and the index distribution comprises:
inputting the second video feature vector and the index distribution to a transformation model to obtain a target index corresponding to the masked region; and
determining, in the discrete hidden space according to the target index, the second quantization feature vector corresponding to the target index,
the transformation model being a machine learning model used for determining an index corresponding to the masked region of the target video.

17. The non-transitory computer-readable storage medium according to claim 15, wherein the inputting a target video and a video mask to an encoding model for feature extraction, and obtaining a first video feature vector and a second video feature vector on the basis of the target video and the video mask comprises:
inputting, to the encoding model for feature extraction, a masked video obtained after multiplying the target video with the video mask, and obtaining the first video feature vector and the second video feature vector on the basis of the target video and the video mask.

18. The non-transitory computer-readable storage medium according to claim 15, wherein the determining an index distribution of the first quantization feature vector in a discrete hidden space composed on the basis of the first quantization feature vector comprises:
determining, in the discrete hidden space composed on the basis of the first quantization feature vector, a position distribution of the first quantization feature vector in the discrete hidden space according to relative spatial position relationships between the first quantization feature vector and other first quantization feature vectors in the discrete hidden space.

19. The non-transitory computer-readable storage medium according to claim 15, wherein the obtaining a first quantization feature vector corresponding to the first video feature vector of the target video comprises:
determining, from a video codebook according to spatial positions between the first video feature vector and quantization feature vectors in the video codebook, a quantization feature vector having a distance value satisfying a distance condition to the first video feature vector as the first quantization feature vector,
the video codebook comprising the quantization feature vectors corresponding to various videos.

20. The non-transitory computer-readable storage medium according to claim 15, wherein the method further comprises:
inputting the second quantization feature vector to a timing sequence integration model, and calculating a timing sequence residual of the second quantization feature vector on the basis of the second quantization feature vector between adjacent frames of the target videos;
updating the second quantization feature vector according to the timing sequence residual to obtain an updated second quantization feature vector; and
inputting the updated second quantization feature vector and the first quantization feature vector to the decoding model to obtain the reconstructed video.

* * * * *